United States Patent Office 3,035,048
Patented May 15, 1962

3,035,048
LOWER ALKYL-3(N-PYRROLIDYL) - 12α - FLUORO-Δ$^{3,5,17(20)}$-PREGNATRIENES AND PROCESS FOR THE PRODUCTION THEREOF
Josef Fried, Princeton, and Patrick A. Diassi, Westfield, N.J., assignors to Olin Mathieson Chemical Corporation, New York, N.Y., a corporation of Virginia
No Drawing. Filed Nov. 20, 1959, Ser. No. 854,222
3 Claims. (Cl. 260—239.5)

This invention relates to, and has for its object, the provision of an improved method for converting known steroids through a series of steps involving the preparation of new intermediates, to physiologically active steroidal final products.

This invention comprises the conversion of the known steroid 12α-fluoro-11β-hydroxyprogesterone by a series of steps involving the preparation of new intermediates, to 12α-fluoro-hydrocortisone and esters thereof having the following formula

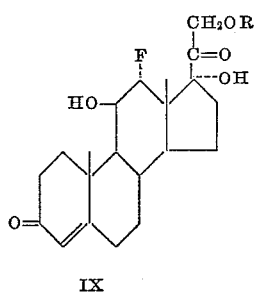

IX wherein R is hydrogen or the acyl radical of a hydrocarbon carboxylic acid of less than ten carbon atoms. Among the suitable carboxylic acid esters there may be named: the lower alkanoic acid esters (e.g., the acetate, propionate, butyrate and enanthate acids); the monocyclic aryl acid esters (e.g., the benzoate); the lower cycloalkanoic acid esters; the monocyclic aralkanoic acid esters (e.g., the phenacetate); the lower alkenoic acid esters; and the lower cycloalkenoic acid esters.

More particularly, this invention comprises the preparation of 12α-fluorohydrocortisone and 21-esters thereof by treating 12α-fluoro-11β-hydroxyprogesterone with di-(lower alkyl)-oxalate and alkali metal-lower alkoxide, treating the resulting dienolate of 2,21-di-(lower alkyl-oxalyl)-12α-fluoro-11β-hydroxyprogesterone with bromine in an anhydrous medium, rearranging and reducing the resulting brominated derivative to yield lower alkyl 12α-fluoro-Δ$^{4,17(20)}$-pregnadiene-11β-ol-3-one-21-oate, forming the 3-pyrrolidyl derivative thereof by reaction with pyrrolidine, reducing the 20-oate radical of the 3-pyrrolidyl-derivative by the action of alkali metal aluminum hydride, treating the resulting 12α-fluoro-3-pyrrolidyl-Δ$^{3,5,17(20)}$-pregnatriene-11β,21-diol with a hydrolyzing agent to split off pyrrolidine and form 12α-fluoro-Δ$^{4,17(20)}$-pregnadiene-11β,21-diol-3-one acylating the latter at the 21-position, oxidizing the 17(20)-unsaturation of the resulting 21-ester thereby saturating the double bond and introducing a hydroxyl group in the 17-position and a keto group in the 20-position to yield the 21-ester of 12α-fluorohydrocortisone and hydrolyzing the latter to obtain the compound 12α-fluorohydrocortisone.

The process of this invention can be followed easily by reference to Chart I and to the following stepwise analysis:

STEP I.—PREPARATION OF 2,21-DI-LOWERALKOXYOXALYL - 12α - FLUORO - 11β - HYDROXYPROGESTERONE AND DIENOLATE THEREOF (II)

Compound I, 12α-fluoro-11β-hydroxyprogesterone is treated with di-(lower alkyl)oxalate and lower alkalimetal alkoxide e.g., sodium methoxide, in a lower alkanol, to form the dialkali metal enolate of Compound II which can be separated from the reaction mixture by precipitation by the addition of a liquid such as ether, in which the reaction product is insoluble. Compound II is obtained by neutralization (with an acid such as a mineral acid) of the disodium enolate. Upon neutralization, Compound II precipitates and the precipitate is collected by filtration and then dried.

STEP II.—PREPARATION OF BROMINATED PRODUCTS III AND IIIa

The di-alkali metal-enolate of Step I is cooled and treated with bromine in an anhydrous medium in which it is soluble. The bromine is added to the anhydrous steroid solution in a ratio of about three moles of bromine to each mole of the steroid, i.e., until the point where the solution is no longer discolored. The solution of Compound IIIa thus prepared is flushed with nitrogen and treated as such with an alkali metal alkoxide in an alkanolic solution to yield Compound III which is separated from solution by precipitation with water, filtration and evaporation in vacuo to dryness.

STEP III.—PREPARATION OF METHYL 12α-FLUORO - Δ$^{4,17(20)}$-PREGNADIENE-11β-OL-3-ONE-21-OATE (IV)

Compound III in a solution of an organic solvent is treated with a reducing agent such as a mixture of zinc and acetic acid. The reaction mixture is filtered. The filtrate is evaporated to dryness and the residue is chromatographed on said acid washed alumina and the benzene soluble fraction evaporated to dryness to yield Compound IV.

STEP IV.—PREPARATION OF METHYL-3-(N-PYRROLIDYL) - 12α - FLUORO-Δ$^{3,5,17(20)}$-PREGNATRIENE-11β-OL-20-OATE- (V)

Compound IV is dissolved in an organic solvent and warmed at a moderate temperature with pyrrolidine. After a short time the reaction mixture is cooled and the resulting precipitate filtered off, washed and then dried to yield Compound V.

CHART I
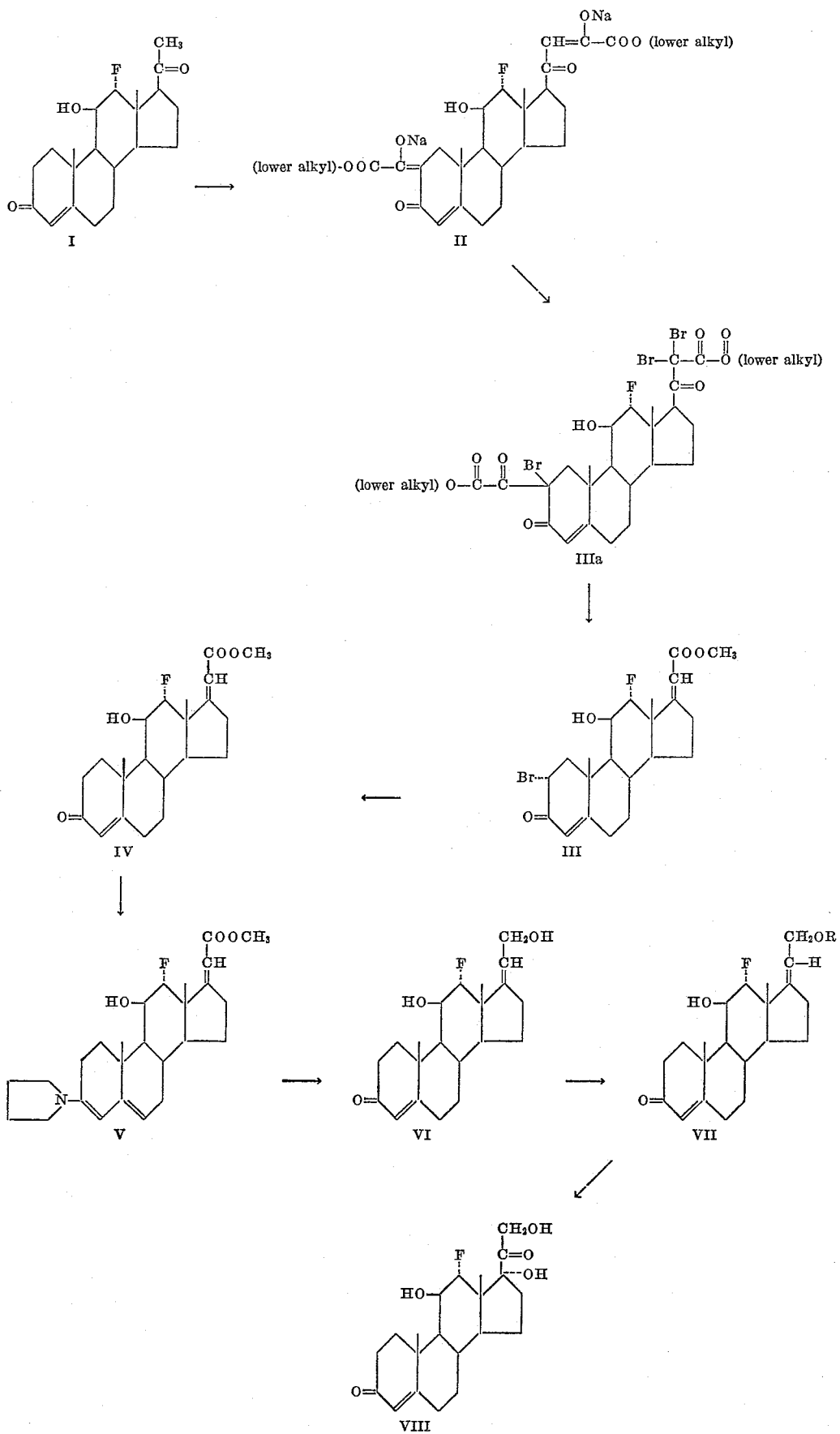

STEP V.—PREPARATION OF 12α-FLUORO-Δ$^{4,17(20)}$-PREGNADIENE-11β,21-DIOL-3-ONE (VI)

Compound V is dissolved in a solvent such as tetrahydrofuran and reduced with an alkali metal aluminum hydride such as lithium aluminum hydride and the blocking pyrrolidyl radical hydrolyzed off. The reaction mixture is neutralized and evaporated to dryness to yield Compound VI.

STEP VI.—PREPARATION OF THE 21-ESTER OF 12α-FLUORO-Δ$^{4,17(20)}$-PREGNADIENE - 11β,21-OL-3-ONE (VII)

Compound VI is treated with an acylating agent such as an anhydride or acid halide of a hydrocarbon carboxylic acid of less than ten carbon atoms selected from the aforementioned groups of acid, i.e., an acid chloride or anhydride corresponding to R of Formula IX when R is acyl. The acylation mixture is evaporated in vacuo and the residue selectively dissolved in the organic phase of a two phase system of water and organic solvent, e.g., chloroform. The organic phase is washed and evaporated to a residue which may be further purified to yield Compound VII.

STEP VIII.—PREPARATION OF THE 21-ESTER OF 12α - FLUORO-PREGNENE-11β,17α,21-TRIOL-3,20-DIONE, I.E., 12α-FLUOROHYDROCORTISONE-21-ESTER (VIII)

Compound VII is dissolved in an organic solvent under anhydrous conditions and then oxidized at the 17(20)-unsaturation by a suitable oxidizing reagent, among which there can be named osmium tetroxide and hydrogen peroxide in a solvent such as tertiary butanol. The residue i.e., partially deacylated (VIII) is recovered from the neutralized reaction mixture by solvent extraction and is obtained in dry form by evaporation under vacuo. It is then reacylated by the action of pyridine with either an acid halide or anhydride as in Step VI to yield compound VIII. The thus prepared fluorohydrin is recovered from the neutralized reaction mixture by extraction, crystallization and evaporation in vacuo. It is readily converted to the free 21-ol with a reagent capable of hydrolyzing the 21-ester, such as dilute potassium carbonate, and the 21-ol readily recovered from the hydrolysis mixture by evaporation and recrystallization.

The compounds of Formula VIII, disclosed in Serial No. 788,246, filed October 23, 1958, are physiologically active steroids which possess glucocorticoid, as well as mineralocorticoid activity. Thus, they may be administered instead of and in the same manner as cortisone or hydrocortisone in the treatment of rheumatoid arthritis and dermatomyositis, or in the same manner as desoxycorticosterone in the treatment of Addison's disease or adrenal insufficiencies, the dosage for such administration being dependent upon their relative activities.

The following examples are presented to further illustrate this invention.

*Example I.—Preparation of 2,21-Diethoxyoxalyl-12α-Fluoro-11β-Hydroxyprogesterone and Sodium Dienolate Thereof (II)*

To a solution of 503 mg. (1.44 mmols.) of 12α-fluoro-11β-hydroxyprogesterone in 8 ml. of dry t-butanol warmed to about 50° C., 1.30 ml. (9.35 mmols.) of diethyloxalate and 2.58 ml. (3.22 mmols.) of 1.25 N sodium methoxide in methanol are added. The mixture is stirred under anhydrous conditions and at room temperature for 3 hours, whereafter the precipitated sodium dienolate of 2,21-diethoxyoxalyl-12α-fluoro-11β-hydroxyprogesterone is filtered, washed with ether and dissolved in 50 ml. of water. The solution is acidified with dilute hydrochloric acid and the precipitate filtered and dried to give 475 mg. (60% yield) of 2,21-diethoxyoxalyl-12α-fluoro-11β-hydroxyprogesterone.

*Anal.*—Calc'd for $C_{29}H_{37}O_9F$ (548.60); C, 63.49; H, 6.80. Found: C, 64.18; H, 6.91.

*Example II.—Preparation of 2,21,21-Tribromo-2,21-Diethoxyoxalyl - 12α - Fluoro-11β-Hydroxyprogesterone (IIIa) and Methyl 2α-Bromo-12α-Fluoro-Δ$^{4,17(20)}$-Pregnadiene-11β-Ol-3-One-21-Oate (III)*

To a solution of 102 mg. (0.186 mmols.) of 2,21-diethyloxalyl-12α-fluoro-11β-hydroxyprogesterone and 73 mg. (.744 mmols.) of anhydrous potassium acetate in 2 ml. of methanol cooled to 0° C. in an ice bath, a solution of 67 mg. (0.42 mmols.) of bromine in 0.84 ml. of methanol is added to produce 2,21,21-tribromo-2,21-diethoxyoxalyl-12α-fluoro - 11β - hydroxyprogesterone. To the resulting solution 0.73 ml. (1.23 mmols.) of sodium methoxide in methanol (1.72 N) is added and the mixture is stirred under nitrogen at room temperature for five hours. Twenty-five milliliters of water is then added and the mixture extracted with three 15 ml. portions of chloroform. The combined chloroform extracts are washed with water and evaporated to dryness in vacuo to give 85.3 mg. of crude methyl 2-bromo-12α-fluoro-Δ$^{4,17(20)}$-pregnadiene-11β-ol-3-one-21-oate.

*Example III.—Preparation of Methyl 12α-Fluoro-Δ$^{4,17(20)}$-Pregnadiene-11β-Ol-3-One-21-Oate (IV)*

85.3 mg. of methyl 2-bromo-12α-fluoro-Δ$^{4,17(20)}$-pregnadiene-11β-ol-3-one-21-oate is dissolved in a mixture of 4 ml. of benzene, 2 ml. of methanol and 1 ml. of glacial acetic acid and 100 mg. of zinc dust is added. After stirring at room temperature for 3 hours the mixture is filtered and the zinc washed with warm benzene. The combined filtrate and washings are washed with water, 5% sodium bicarbonate and again with water, dried over sodium sulfate and evaporated to dryness. The residue is crystallized from ethyl acetate-hexane to give 14 mg. of methyl 12α-fluoro-Δ$^{4,17(20)}$-pregnadiene-11β-ol-3-one-21-oate having a M.P. about 248–250°, $[\alpha]_D^{25}$+185° (c, 0.4, chlf.), $\lambda_{max.}^{alc.}$ 235 mμ, $\epsilon$=21,500; $\lambda_{max.}^{Nujol}$ 3.00, 5.81, 6.05, 6.17 μ

*Anal.*—Calc'd for $C_{22}H_{29}O_4F$ (377.45): C, 70,00; H, 7.77. Found: C, 70.12; H, 8.09.

*Example IV.—Preparation of Methyl 3-(N-Pyrrolidyl)-12α-Fluoro-Δ$^{3,5,17(20)}$-Pregnatriene-11β-Ol-21-Oate (V)*

To a warm solution of 131 mg. (0.347 mmols.) of methyl 12α-fluoro-Δ$^{4,17(20)}$-pregnadiene-11β-ol-3-one-21-oate in 7 ml. of methanol kept under nitrogen 0.4 ml. of pyrrolidine is added. The mixture is warmed on a steam bath for five minutes. On cooling the crystalline enamine separates. It is filtered, washed with cold methanol and dried.

Yield: 124 mg. having the following properties: M.P. about 235–242° C.; $[\alpha]_D^{23}$=—45.7° (c, 0.402, CHCl$_3$); $\lambda_{max.}^{5\%HCl-MeOH}$ 220 mμ ($\epsilon$=18,000), 274 mμ ($\epsilon$=19,050);

$\lambda_{max.}^{Nujol}$ 2.91, 5.91, 5.71, 6.04, 6.15, 6.27 μ

*Anal.*—Calc'd for $C_{26}H_{36}O_3NF$ (429.56): C, 72,69; H, 8.45; N, 3.26. Found: C, 72.54; H, 8.52; N, 3.57.

*Example V.—Preparation of 12α-Fluoro-Δ$^{4,17(20)}$-Pregnadiene-11β,21-Diol-3-One (VI)*

A solution of 66.4 mg. of methyl 3-(N-pyrrolidyl)-12α-fluoro-Δ$^{3,5,17(20)}$-pregnatriene-11β-ol-21-oate in 5 ml. of dry tetrahydrofuran is added dropwise to a suspension of 100 mg. of lithium aluminum hydride in 3 ml. of dry tetrahydrofuran. The mixture is stirred at room temperature for 1 hour and then the excess lithium aluminum hydride is decomposed with a few drops of ethyl acetate followed by methanol. Ten milliliters of a buffer consisting of 4 g. of sodium acetate in 10 ml. of water, 4 ml. of glacial acetic acid and 50 ml. of methanol is added and the mixture refluxed under nitrogen for 4 hours. The mixture is then evaporated nearly to dryness and the residue distributed between chloroform and 2 N HCl. The chloroform phase is separated, washed with dilute sodium bicarbonate then twice with water and evaporated to dryness. Crystallization of the residue from acetone-hexane gives 34 mg. of 12α-fluoro-$\Delta^{4,17(20)}$-pregnadiene-11β,21-diol-3-one, of the following properties: M.P. about 199–200° C.; $[\alpha]_D^{23}+154°$ (chlf.);

$\lambda_{max.}^{EtOH}$ 242 mμ (ε=15,000). $\lambda_{max.}^{Nujol}$ 3.00, 6.04, 6.20 μ

Anal.—Calc'd for $C_{21}H_{29}O_3F$: C, 72.38; H, 8.39; F, 5.45. Found: F, 5.22.

*Example VI.—Preparation of 12α-Fluoro-$\Delta^{4,17(20)}$-Pregnadiene-11β,21-Diol-3-One-21-Acetate (VII)*

A solution of 47.8 mg. (0.137 mmols.) of 12α-fluoro-$\Delta^{4,17(20)}$-pregnadiene-11β,21-diol-3-one in 4 ml. of pyridine and 2 ml. of acetic anhydride is protected from moisture and left overnight at room temperature. The reagents are then removed in vacuo, and the residue distributed between chloroform and 2 N hydrochloric acid. The chloroform extract is separated, washed successively with 5% NaHCO₃ and twice with water, dried and evaporated to dryness, in vacuo. The residue on crystallization from acetone-hexane gives 25 mg. of 12α-fluoro-$\Delta^{4,17(20)}$-pregnadiene-11β-ol-3-one-21-acetate exhibiting the following properties: M.P. about 227.230°; $[\alpha]_D^{23}+199°$ (chlf.);

$\lambda_{max.}^{EtOH}$ 240 mμ (ε=15,800) $\lambda_{max.}^{Nujol}$ 2.98; 5.72, 6.06, 6.20 μ

Anal.—Calc'd for $C_{23}H_{31}O_4F$ (390.48); C, 70.74; H, 8.00; F, 4.86. Found: C, 70.82; H, 8.02; F, 4.91.

*Example VII.—Preparation of 12α-Fluorohydrocortisone-21-acetate (VIII)*

(a) To a suspension of 49.8 mg. (0.128 mmols) of 12α-fluoro-$\Delta^{4,17(20)}$-pregnadiene-11β,21-diol-3-one-21-acetate in 2 ml. of dry tertiary butanol there is added 0.05 ml. of pyridine and 0.2 ml. of a solution of osmium tetroxide in dry t-butanol (11 mg./ml.). While stirring, 0.14 ml. of a 1.89 M solution of hydrogen peroxide is added and the reaction left at room temperature for 16 hours. Nitrogen is bubbled through the reaction mixture for 15 minutes and an oxygen-free solution of 50 mg. of sodium sulfite in 3 ml. of water is added. After five minutes at room temperature, under nitrogen, the mixture is neutralized with 10% acetic acid, diluted with 10 ml. of water and extracted with chloroform. The chloroform extract is washed with water and evaporated to dryness. The residue is dissolved in 1 ml. of dry pyridine and 0.5 ml. of acetic anhydride and left at room temperature overnight. The solvents are removed in vacuo, and the residue distributed between chloroform and water. The chloroform extract is washed successively with 2 N HCl, 5% NaHCO₃ and water and evaporated to dryness. The residue is dissolved in benzene and chromatographed on 2.0 g. of silica gel. The fractions eluted with chloroform and 10% acetone in chloroform are combined and chromatographed on Whatman No. 1 paper overnight using a toluene-propylene glycol system. The paper is dried and the bands detected by ultraviolet absorption. The band which had moved approximately 3 mm. from the origin is eluted with methanol, the methanol evaporated to dryness, and the residue distributed between chloroform and water. The chloroform phase is separated, washed again with water and evaporated to dryness. Crystallization of the residue gives 12α-fluorohydrocortisone 21-acetate melting at about 228–229° C. and having the following properties $[\alpha]_D^{22}+106°$ (chlf.);

$\lambda_{max.}^{Nujol}$ 3.00μ, 5.75μ, 5.85μ and 6.07μ.

Anal.—Calc'd for $C_{23}H_{31}O_6F$ (422.48); C, 65.39; H, 7.39. Found: C, 65.22; H, 7.27.

(b) The residue of part (a) is treated with dilute potassium carbonate in an alcoholic solution (free from oxygen) under an atmosphere of nitrogen for one hour at room temperature. The solution is neutralized with dilute acetic acid and concentrated whereupon 12α-fluorohydrocortisone crystallizes out.

The invention may be variously otherwise embodied within the scope of the appended claims.

What is claimed is:

1. Lower alkyl 3-(N-pyrrolidyl)-12α-fluoro-$\Delta^{3,5,17(20)}$-pregnatriene-11β-ol-21-oate.

2. The process for the preparation of the compound of claim 1 which comprises reacting pyrrolidine with lower alkyl 12α-fluoro-$\Delta^{4,17(20)}$-pregnadiene-11β-ol-3-one-20-oate and recovering the product thus formed.

3. The process for the preparation of 12α-fluoro-$\Delta^{4,17(20)}$-pregnadiene-11β,21-diol-3-one which comprises treating lower alkyl 3-(N-pyrrolidyl)-12α-fluoro-$\Delta^{3,5,17(20)}$-pregnatriene-11β-ol-21-oate with alkali metal aluminum hydride, subjecting the resulting 3-(N-pyrrolidyl)-12α-fluoro-$\Delta^{3,5,17(20)}$-pregnatriene-11β,21-diol to hydrolysis to remove the N-pyrrolidyl group and recovering the product thus formed.

References Cited in the file of this patent

UNITED STATES PATENTS 2,790,814    Hogg et al. _____ Apr. 30, 1957

OTHER REFERENCES

Herz et al.: Journal of American Chemical Society, vol. 78 (1956), pp. 2017–18 relied on.

UNITED STATES PATENT OFFICE
CERTIFICATE OF CORRECTION

Patent No. 3,035,048                      May 15, 1962

Josef Fried et al.

It is hereby certified that error appears in the above numbered patent requiring correction and that the said Letters Patent should read as corrected below.

Columns 3 and 4, CHART I, formula IIIa should appear as shown below instead of as in the patent:

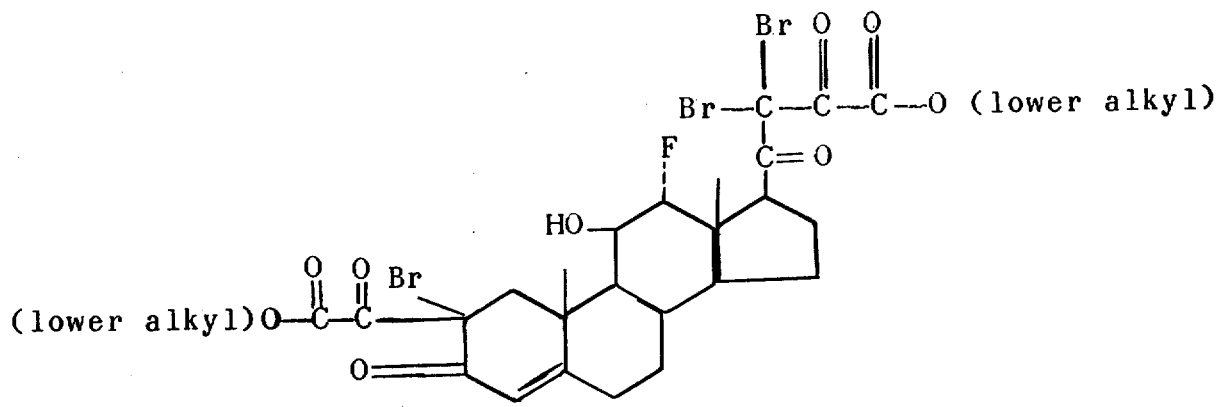

same chart, formula VIII should appear as shown below instead of as in the patent:

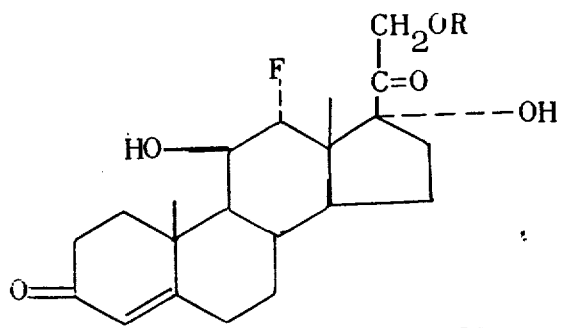

column 6, line 57, for "5.91" read -- 5.81 --; same line, strik out "5.71".

Signed and sealed this 6th day of November 1962.

(SEAL)
Attest:

ERNEST W. SWIDER

Attesting Officer

DAVID L. LADD

Commissioner of Patents